(12) United States Patent
Goyal

(10) Patent No.: US 10,193,338 B2
(45) Date of Patent: Jan. 29, 2019

(54) VOLTAGE TRIGGERED EDGE INSENSITIVE PROTECTION CIRCUIT

(71) Applicant: SYNAPTICS INCORPORATED, San Jose, CA (US)

(72) Inventor: Abhijat Goyal, Lakeway, TX (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/588,309

(22) Filed: May 5, 2017

(65) Prior Publication Data

US 2018/0323609 A1 Nov. 8, 2018

(51) Int. Cl.
*G06F 3/045* (2006.01)
*H02H 9/04* (2006.01)
*G06F 3/044* (2006.01)

(52) U.S. Cl.
CPC ............ *H02H 9/046* (2013.01); *G06F 3/044* (2013.01); *H02H 9/044* (2013.01); *G06F 2203/04108* (2013.01)

(58) Field of Classification Search
CPC .......... G06F 3/044; G06F 2203/04108; H01L 23/60; H01L 23/62; H01L 27/0285; H01L 27/0288; H01L 27/0282; H03K 17/082; H03K 17/0822
See application file for complete search history.

(56) References Cited

U.S. PATENT DOCUMENTS

| | | | | |
|---|---|---|---|---|
| 4,664,764 A * | 5/1987 | Zofan | ..................... | C23F 13/04 204/196.03 |
| 5,416,504 A * | 5/1995 | Ohashi | ..................... | B41J 2/471 347/247 |
| 5,508,649 A | 4/1996 | Shay | | |
| 5,561,577 A * | 10/1996 | Motley | ............... | H01L 27/0251 361/111 |
| 5,838,146 A * | 11/1998 | Singer | .................... | H02H 9/046 323/270 |
| 5,898,625 A * | 4/1999 | Manning | ................ | G11C 5/145 327/538 |
| 9,293,912 B2 * | 3/2016 | Parthasarathy | .......... | H02H 9/04 |
| 2005/0225912 A1* | 10/2005 | Pant | .................... | H01L 27/0285 361/56 |
| 2007/0115600 A1* | 5/2007 | Lohr | ..................... | H02H 9/046 361/111 |

(Continued)

FOREIGN PATENT DOCUMENTS

WO WO 2009134515 A1 * 11/2009 ......... H01L 27/0248

*Primary Examiner* — Joe H Cheng
(74) *Attorney, Agent, or Firm* — Patterson + Sheridan, LLP

(57) ABSTRACT

Embodiments of disclosure generally relate to integrated circuits (ICs) and, more particularly, a voltage-triggered edge-insensitive electrostatic discharge (ESD) clamp for protection of ICs. An example trigger circuit is provided for controlling a current shunt in an IC. The trigger circuit generally includes a comparison circuit configured to compare a monitored voltage to a reference voltage and output a signal indicating when the monitored voltage reaches or exceeds the reference voltage; and a shunt circuit configured to shunt the current based on receiving the signal from the comparison circuit. The voltage-triggered edge-insensitive clamp provides a single protection circuit that protects against all types of ESD and/or electrostatic overstress (EOS) events.

18 Claims, 5 Drawing Sheets

(56) References Cited

U.S. PATENT DOCUMENTS

| | | | | |
|---|---|---|---|---|
| 2008/0238370 | A1* | 10/2008 | Carrier | H01M 2/1022 320/134 |
| 2009/0195944 | A1* | 8/2009 | Goyal | H02H 9/046 361/56 |
| 2010/0060244 | A1* | 3/2010 | Kurokawa | H02J 7/0029 320/166 |
| 2012/0162831 | A1* | 6/2012 | Wang | H01L 27/0251 361/56 |
| 2016/0216836 | A1* | 7/2016 | Yao | G06F 3/0418 |
| 2017/0155243 | A1* | 6/2017 | Tan | H02H 9/046 |
| 2017/0351380 | A1* | 12/2017 | Ahn | G06F 3/044 |
| 2018/0082992 | A1* | 3/2018 | Mertens | H01L 27/0248 |

* cited by examiner

VOLTAGE TRIGGERED EDGE INSENSITIVE PROTECTION CIRCUIT

BACKGROUND

Field of the Disclosure

Embodiments of the disclosure generally relate to integrated circuits (ICs) and, more particularly, to a voltage triggered edge insensitive protection circuit.

Description of the Related Art

Electrostatic discharge (ESD) is often used to describe a high voltage that may cause permanent damage to a circuit. ESD results in a momentary and sudden electric current that flows when an excess of electric charge, stored on an electrically insulated structure, finds a path to a structure at a different electrical potential, such as ground.

One of the causes of ESD events is static electricity. Static electricity is often generated through the separation of electric charges when two materials are brought into contact and then separated. Another cause of ESD is through electrostatic induction. This occurs when an electrically charged object is placed near a conductive object isolated from ground. The presence of the charged object creates an electrostatic field that causes electrical charges on the surface of the other object to redistribute. Even though the net electrostatic charge of the object has not changed, it now has regions of excess positive and negative charges. An ESD stress may occur when the object comes into contact with a conductive path.

ESD can be the result of different types of ESD events. ESD events can occur in ICs and includes powered events (e.g., in a cell phone) and non-powered events (e.g., during manufacturing and assembly). Some non-limiting examples of ESD events include component level events, which can be the result of discharge through skin of an inadequately grounded person and may include human body model (HBM) ESD events, charged-device modem (CDM) ESD events, machine model (MM) ESD events, and other JEDEC standards events. Other ESD events are system level events, which include IEC standard defined ESD events, surge ESD events, and the like.

ESD can be destructive and may leave a system in an unknown state from which recovery is impossible. ICs are made from semiconductor materials such as silicon and insulating materials like silicon dioxide. Either of these materials can suffer permanent damage when subjected to high voltages. The damaging effects of ESD poses unacceptable risks in many areas of technology and it is necessary to control such interference and reduce the risks to acceptable levels.

Several methods have been developed to mitigate or avoid the effects of ESD. Some of these methods are cheap but modify the behavior of the equipment. An ideal solution balances robust application and cost, and is unlikely to behave erratically.

One method to protect input/outputs (I/O) lines from ESD is to provide special purpose ESD protection devices on the vulnerable traces. ESD protection devices for touch sensing devices may need to have a low capacitance. Conventional ESD protection devices are triggered by the rising edge of the ESD transient. ESD protection circuits typically include a resistor capacitor (RC) element that allows the protection circuit to trigger on the rising edge of the ESD event. The rise time can be different for different types of ESD events. For example, the rise time for a HBM event can be 10 ns, the rise time for an IEC ESD event can be 1 ns, and the rise time for a CDM ESD event can be 100 µs. In some case, the rise time of the type of ESD event being protected against can be similar to the rise time of the chip during normal power, which can lead to the ESD protection circuit to trigger during normal power up. Typically, in order to prevent the ESD protection circuit from triggering during normal power up of the chip, the ESD protection circuit and chips are designed such that the ESD protection circuit protecting it from ESD events has a rise time several orders of magnitude faster than the rise time for normal power up. For example, the chip may have a rise time in the range 10 µs for normal power up without triggering the ESD protection circuitry.

As technology develops, however, new ESD protection requirements are desired for various applications and devices. These new ESD protection requirements can have various ranges of rise times and can overlap the rise time of the power on for the device. One exemplary emerging area for ESD protection is surge protection. The rise time of a surge event can be anywhere can vary from system to system depending on the parasitics of the system that the chip is being used in. In one example, the rise time of a surge event may be between 1 µs to 50 µs. Some examples of other ESD transients (i.e., rise times) in the semiconductor industry that manufacturers sometimes qualify their parts against include 2-10 ns for HBM, 100-800 µs for CDM, 1 ns for IEC, 100 ns-10 µs for CBM, and 1 µs-100 µs for surge.

The need for ESD protection for different ranges of rise times and rise times overlapping the rise time for normal power up make it difficult to design ESD protection circuits that trigger based on the rising edge, which can handle the protected ranges of the ESD event while also avoiding triggering during the normal power up of the device.

Accordingly, techniques for improved ESD protection circuits are desired.

SUMMARY

This disclosure generally provides input devices, processing systems, and methods for a voltage triggered edge insensitive ESD clamp.

In an embodiment, a trigger circuit for controlling a current shunt in an integrated circuit is provided. The trigger circuit generally includes a comparison circuit configured to: compare a monitored voltage to a reference voltage; and output a signal indicating when the monitored voltage is equal to or greater than the reference voltage; and a shunt circuit configured to shunt the current based on receiving the signal from the comparison circuit.

In another embodiment, a method for controlling a current shunt in an integrated circuit is provided. The method generally includes comparing a monitored voltage to a reference voltage; outputting a signal indicating when the monitored voltage is equal to or greater than the reference voltage; and shunting the current based on receiving the signal.

In yet another embodiment, an input device is provided. The input device generally includes a plurality of sensor electrodes; and a processing system coupled to the plurality of sensor electrodes, comprising: sensor circuitry configured to operate the plurality of sensor electrodes for capacitive sensing and determine proximity of an input object based on the capacitive sensing; and trigger circuitry comprising: a comparison circuit configured to compare a monitored voltage to a reference voltage; and output a signal indicating when the monitored voltage is equal to or greater than the reference voltage; and a shunt circuit configured to shunt a current based on receiving the signal from the comparison circuit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
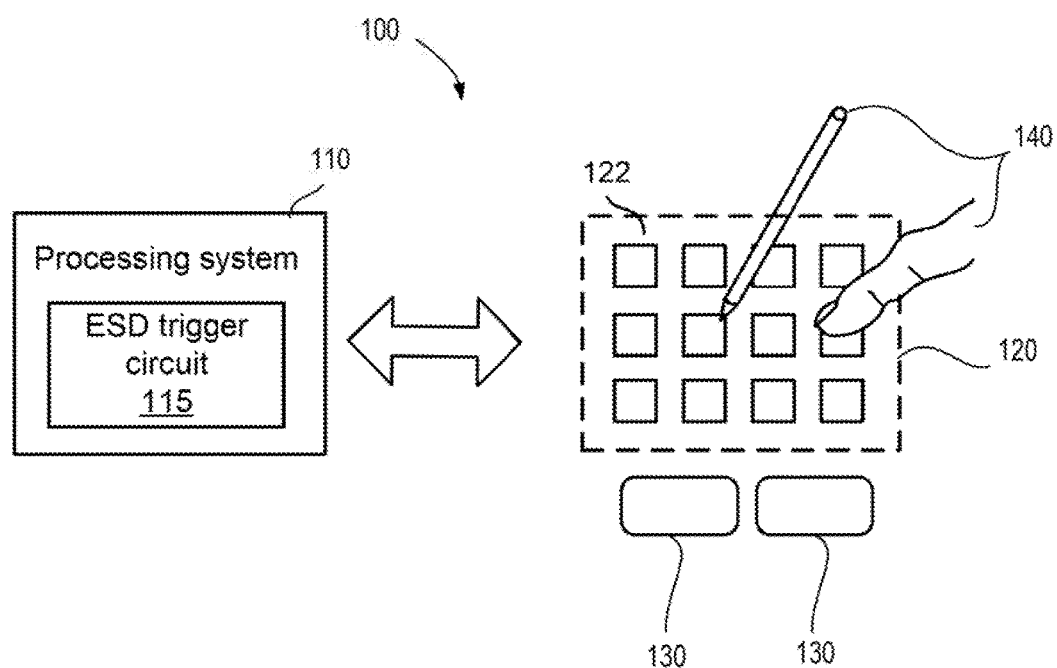
FIG. 1 is a block diagram of an exemplary input device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

As will be described in more detail herein, embodiments of the present disclosure provide for an ESD protection circuit that triggers based on the ESD voltage level—rather than the rising edge of the ESD transient. Thus, the proposed ESD trigger is voltage level sensitive, and edge insensitive. The solution allows for a single ESD protection circuit that can be used for multiple different types of ESD events having multiple different rise times. While aspects of the present disclosure may be described with respect to ESD protection, the protection circuit and techniques described herein may also be used to protect again electrostatic overstress (EOS) events.

ESD protection circuits may be used in various different types of ICs. In one exemplary implementation, ESD protection circuits may be used in input devices, such as proximity sensor devices, and/or integrated display and sensing devices. One such example device in which an ESD protection circuit can be used is illustrated in FIG. 1.

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

As utilized herein, capacitive sensing is described as a touch sensing technique utilizing information received from capacitive sensor electrodes at least some of which may be combination electrodes, while force sensing is described as utilizing information received from force sensor electrodes to determine force that an input object exerts against the input device.

Some input devices may be configured for touch sensing. Touch sensing may be performed by driving one or multiple sensor electrodes of the input device with a modulating signal and receiving resulting signals having effects indicating changes in capacitance of the sensor electrodes. The changes in capacitance can be used to determine a position of an input object. Typically, touch controllers demodulate the signal(s) from the sensor electrodes using single phase demodulation. In some cases, touch controllers demodulate the signal(s) from the sensor electrodes using single phase demodulation.

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes 122 reside, by face sheets applied over the sensor electrodes 122 or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

As shown in FIG. 1, and described in more detail below, the processing system 110 of the input device 100 can include an ESD trigger circuit 115. The ESD trigger circuit 115 may protect the system from ESD events. As described herein, the ESD trigger circuit 115 may be configured to protect against multiple different types of ESD events having different rise times. The ESD trigger circuit 115 (e.g., referred to as a shunt circuit, current shunt circuit, ESD clamp) may be voltage level sensitive and edge insensitive. While aspects herein discuss ESD, these aspects may also be applied for electrostatic overstress (EOS) protection.

The ESD trigger circuit 115 is triggered (e.g., turned on, shunts) subject to any ESD (or EOS) stress event, irrespective of the rise time of the ESD transient—i.e., edge-insensitive.

The ESD trigger circuit 115 is a low leakage, tunable, area efficient solution that minimizes build of materials (BOM) cost by enabling the single protection circuit to be effective against any of the customer ESD requirements.

The ESD trigger circuit 115 can be used to protect against all voltage domains, from a core domain of 0.9 V to high voltage domains of 35 V and higher, for example.

The ESD trigger circuit 115 can protect against both powered and non-powered events. Some non-limiting examples includes human body modem (HBM) events, charged-device modem (CDM) events, human metal model (HMM) events, machine model (MM) events, charged board events (CBE), cable discharge events (CDE), surge events, IEC standards events, etc. Surge protection may be useful for integrated touch and display devices that may use a single chip for display driving and capacitive touch sensing.

Example Trigger Circuit Using Always ON Power Supply for Reference Voltage

In recent times, transistor geometries have shrunk in order to allow for semiconductor devices (chips, circuits, ICs, etc.) with larger numbers of transistors and smaller form factor. The leakage power through the semiconductor devices has been rising at a rapid rate. Leakage power is the current conducted to electrical ground even when the semiconductor device is not actively switching or working. The active power is the power that the semiconductor device will use during active switching or when the semiconductor device is working. With the shrinking transistor geometries, the leakage power can exceed or reach a significant ratio of the active power.

In order to mitigate or avoid wastage of current and, therefore, power, semiconductors devices can be designed to shut down portions of the chip that are not being used (e.g., inactive) or in some cases all power to the chip can be shutdown, such as when the system is not being used. In these cases, at least one power input can remain on (e.g., referred to as always ON power input/supply) to maintain memory states, look for a wake up signal to the chip, etc.

Figure 2:
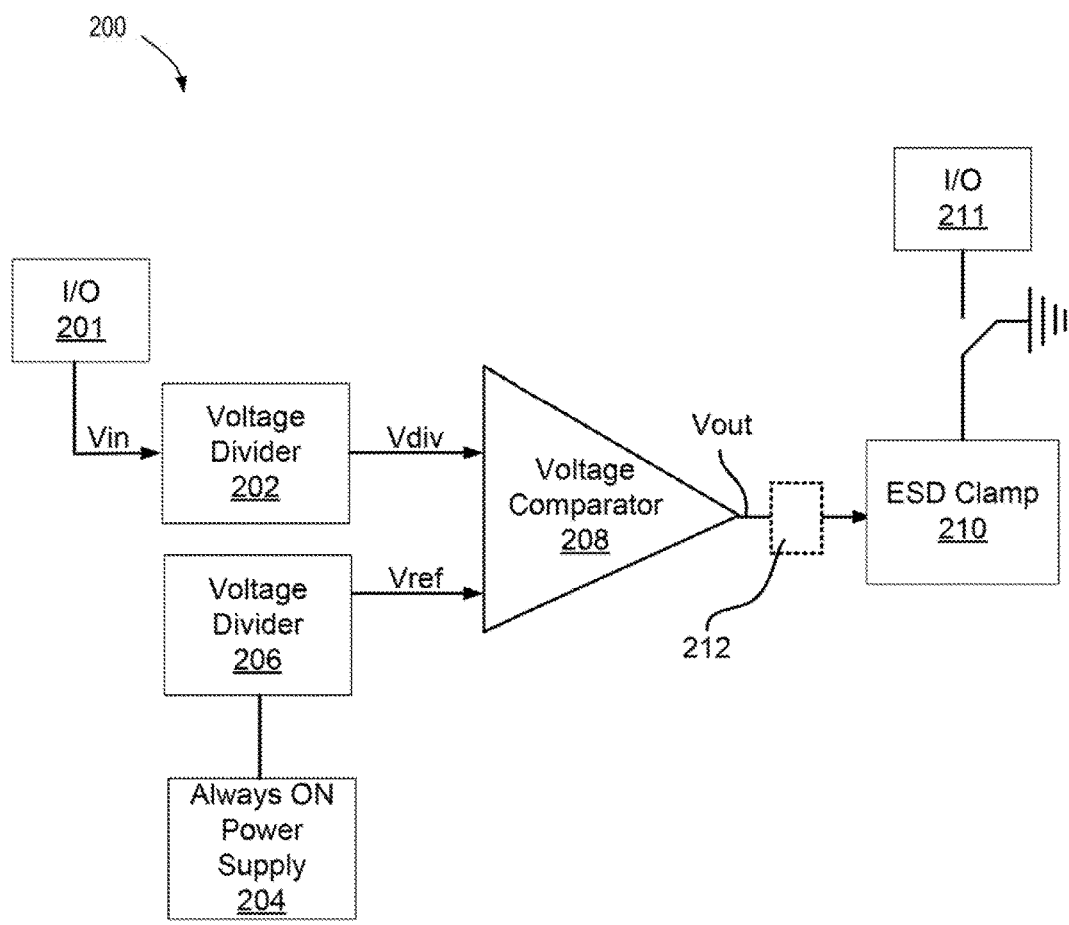
FIG. 2 is a block diagram depicting a trigger circuit according to an embodiment.

FIG. 2 is a block diagram depicting a trigger circuit 200 that uses the always ON power supply for a reference voltage, according to an embodiment.

As shown in FIG. 2 the reference voltage Vref is generated from the Always ON power supply of the chip. This reference voltage can be anywhere from 0.85 V to 3.63 V, for example. The reference voltage is input to the comparator 208. As shown in FIG. 2, the Vref is generated using a voltage divider 206 (e.g., a resistor divider). For example, the Always On voltage can be input to the voltage divider 206 and the voltage divider 206 outputs a voltage level for Vref that can be anywhere between 99% and 1% of the Always On supply.

A voltage divider (also known as a potential divider) is a passive linear circuit that produces an output voltage Vout (e.g., Vref) that is a fraction of its input voltage Vin (e.g., the Always On voltage). Voltage division is the result of distributing the input voltage among the components of the divider. A voltage divider referenced to ground is created by connecting two electrical impedances in series. The input voltage Vin is applied across the series impedances $Z_1$ and $Z_2$ and the output is the voltage across $Z_2$. If the current in the output wire is zero then the relationship between the input voltage $V_{in}$ and the output voltage $V_{out}$ is:

$$V_{out}=(Z_2/(Z_1+Z_2)) \cdot V_{in}$$

$Z_1$ and $Z_2$ may be composed of any combination of elements such as resistors, inductors and capacitors. A resistive divider is the case where both impedances $Z_1$ and $Z_2$ are purely resistive. A simple example of a resistive divider is two resistors connected in series, with the input voltage applied across the resistor pair and the output voltage emerging from the connection between them.

The voltage divider 206 can be configured as a string of small resistors (e.g., a resistor ladder). Thus, the Vref may easily tunable via the resistor ladder, allowing for porting of the same design between different fabrication facilities with a single metal mask layer change. The resistor ladder also provides for easy tenability of the trip point of the comparator thereby allowing for the same clamp architecture to be used for protecting different power domains, such as the core power domain, 1.8 V power domain, 3.3 V power domain, 6 V power domain, and higher. According to embodiments, many different configurations can be used for the voltage divider 206 to generate Vref. Vref may be above or below the operating voltage of the IC.

As shown in FIG. 2, the voltage Vin from the domain that is being protected is divided at voltage divider 202. For example, the first voltage divider 202 can be coupled to an I/O 201 (e.g., an IC pad) of the portion of the IC being protected/monitored for ESD, that provides the Vin. In some examples, voltage divider 202 can be configured as a diode-connected n-type metal oxide semiconductor (NMOS) field effect transistor and resistors to generate a voltage divided rail (e.g., the monitored voltage) Vdiv. In some example configurations, a resistor at the end of the diode chain may be used provide bias current to the diode chain allowing an accurate trip point. According to embodiments, many different configurations can be used for the voltage divider 202 to generate the Vdiv. In some cases, rather than a diode chain, more sophisticated circuitry can be used for generation of the Vdiv. In some embodiments, the protected voltage Vin can be input directly to comparator 208, for example, based on the desired trigger point.

According to certain aspects, the voltage dividers may be designed such that the ratio Vin/Vdiv is below the breakdown voltage of the IC being protected and/or above the operating power of the IC.

The monitored voltage Vdiv and the reference voltage Vref can be compared using comparator 208. As soon as $V_{div}$ reaches or exceeds (e.g., is equal to or greater than) $V_{ref}$, the ESD clamp device 210 will turn on and shunt the ESD current to ground. A comparator is a device that compares two voltage inputs and outputs a digital signal indicating which is larger. A comparator may have analog input terminals and binary digital output. For example, the comparator may output a logic "0" or a logic "1" to indicate which of the inputs is larger. Based on the output from the comparator 208, the ESD clamp device 210 can shunt the ESD current to ground. For example, ESD clamp device 210 may be a switch or transistor that can either shunt the voltage the ground or allow the voltage to flow to the IC, for example, to the I/O 211 of the IC. According to embodiments, various different configurations can be used for the comparator 208 to compare the voltages.

In some embodiments, the output of the comparator 208 may be fed into an inverter 212, such as a p-type metal oxide semiconductor (PMOS) field effect transistor device. According to embodiments, many different configurations can be used for the inverter to invert the signal output from the comparator 208. Other embodiments can exclude this stage and connect a second output of the comparator 208 to a source follower PMOS following this stage. If the inverter is used, the inverted signal is fed to the source follower PMOS with a resistor as the pull down.

The inverted signal can be used as the gate of the ESD clamp device 210. According to embodiments, many different configurations can be used for the ESD clamp device 210 to shunt the current in the IC. In certain examples, the ESD clamp device 210 may be an NMOS device, PMOS device, stacked PMOS device, stacked NMOS device, or other device or combination of devices.

The trigger circuit 200 can be used for both powered and non-powered ESD (and/or EOS) events. During a powered on event, for example, such as an IEC standard event or a surge event, the reference voltage Vref will be some fraction of the always ON voltage supply of the chip. Once the Vdiv is equal to or higher than the Vref, the comparator 208 will send a signal to the ESD clamp device 210 that will shunt the circuit. In the case of non-powered ESD events, for example, such as HBM, CDM, MM, HMM, etc., the reference voltage Vref will be floating (e.g., floating around the Vt of the transistor which may be around 0.5 V-1.0 V), and can be anywhere between the diode drop voltage and the operating voltage of the device (e.g., typically a few hundred mV, positive or negative). In such cases, during an ESD event, the trigger point of the clamp may be low and provides a path to ground for the ESD event.

Figure 3:
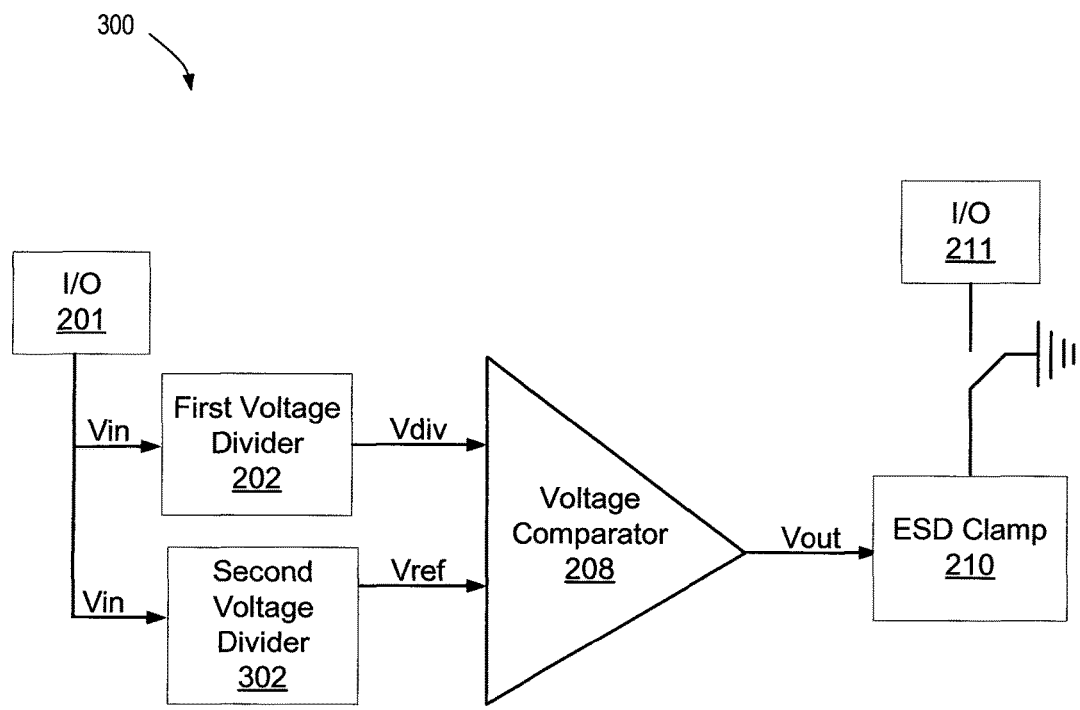
FIG. 3 is a block diagram depicting another trigger circuit according to an embodiment.

Example Trigger Circuit Using a Second Divided Protected Voltage as the Reference Voltage FIG. 3 is a block diagram depicting another trigger circuit using different voltage dividers for the protected voltage as the reference voltage (where the protected voltage can be used as the reference voltage), according to an embodiment.

According to certain embodiments, rather than using the Always ON for the reference voltage at the comparator 208, instead, a second voltage divider 302 can be used to divide Vin. In this case, Vin is input to the first voltage divider 202 which has a first configuration (e.g., of resistors, transistors, and/or diodes) that outputs the Vdiv having a first slope of voltage to current. Vin is also used as input to the second voltage divider 302 which has a different configuration (e.g., of resistors, transistors, and/or diodes) than the first voltage divider 202 and outputs a voltage that can be used as the reference voltage, having a different slope than Vdiv.

Thus, the slopes of the Vdiv and Vref on the protected rail are different. These two inputs with different slopes intersect at a specific voltage level, thereby triggering the comparator 208 and shunting the ESD energy using the ESD clamp device 210.

In one illustrative, non-limiting example, one of the voltage dividers may use a resistor ladder, while the other voltage divider uses a diode-connected NMOS/PMOS ladder.

Example Method for ESD Protection

Figure 4:
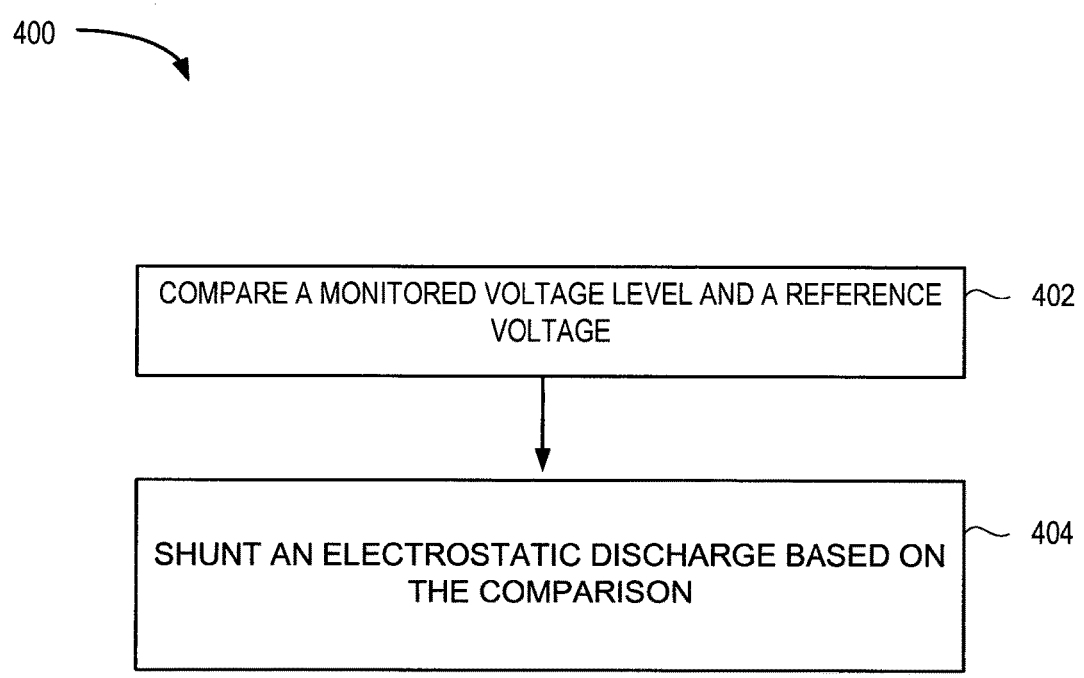
FIG. 4 is a flow diagram depicting a method of triggering a protection circuit according to an embodiment.

FIG. 4 is a flow diagram depicting a method 400 for triggering an ESD shunt in an integrated circuit (e.g., in a capacitive sensing device), according to an embodiment. Aspects of the method 400 can be understood with reference to the trigger circuit 200 shown in FIG. 2.

The method 400 begins at step 402, by comparing a monitored voltage and a reference voltage (e.g., at the comparator 208). At step 404, the ESD current is shunted (e.g., by the ESD clamp device 210) based on the comparison (e.g., receiving an output signal from the comparator 208).

Although not shown in FIG. 4, the method 400 may further include receiving an input voltage (e.g., the protected rail) and dividing the input voltage to generate the monitored voltage (e.g., by the voltage divider 202). The method 400 may further include receiving the input voltage and dividing the input voltage to generate the reference voltage (e.g., by the second voltage divider 302). The input voltage can be divided to output the monitored voltage having a first slope of voltage to current and divided to output the reference voltage having a second slope of voltage to current different than the first slope.

Figure 5:
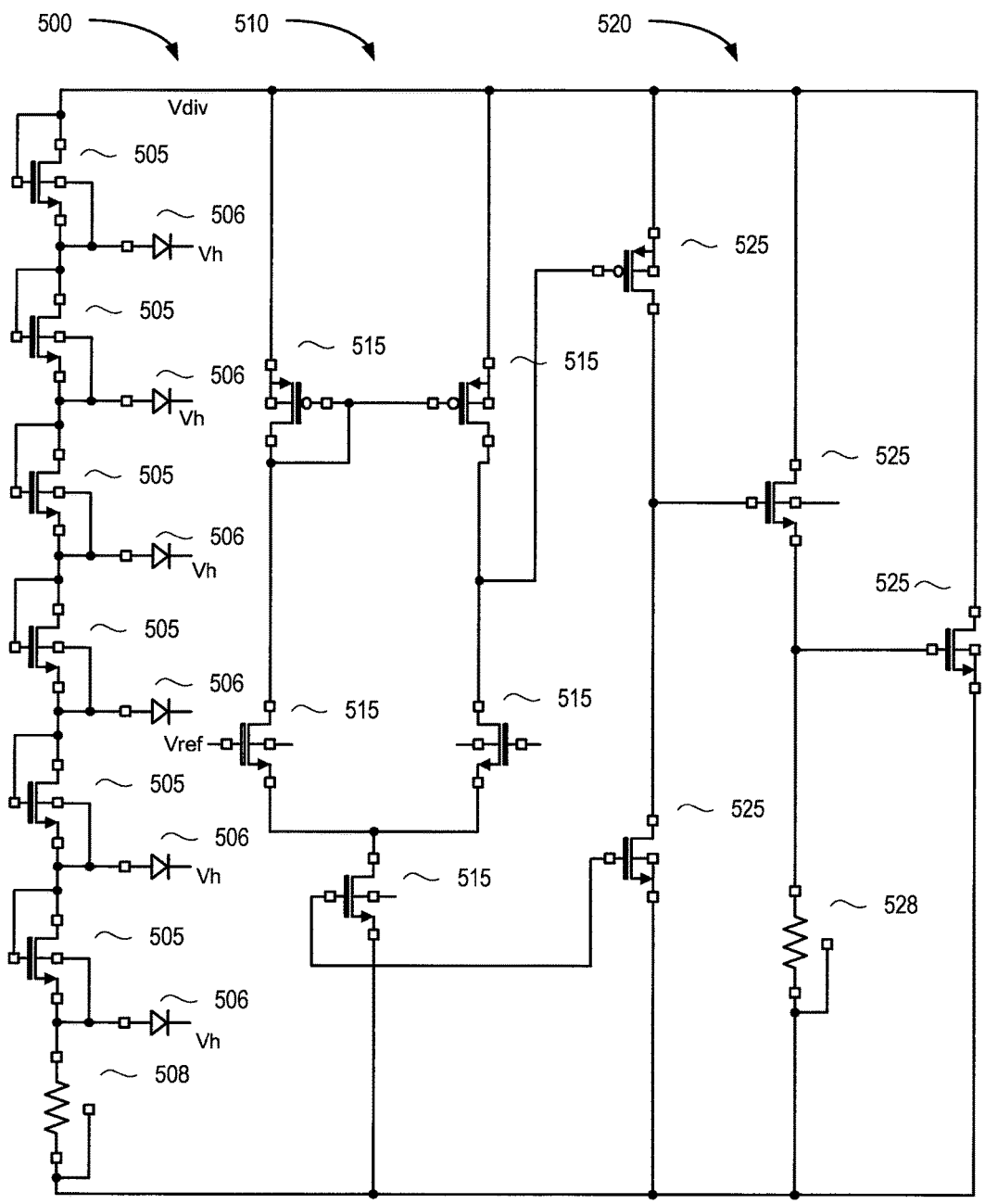
FIG. 5 is an example protection circuit according to an embodiment.

FIG. 5 is an example protection circuit according to an embodiment described herein. FIG. 5 is illustrative of one configuration of a voltage triggered edge-insensitive trigger circuit. As shown in FIG. 5, the protection circuit includes the voltage divider circuit 500, comparator circuit 510, and ESD shunt circuit 520. The voltage divider circuit 500 includes the string of transistors 505, diodes 506, and resistor bias 508.

Although not shown in FIG. 5, the protection circuit can be coupled to an output of an integrated circuit, or a portion of an integrated circuit, being monitored/protected from ESD (or EOS). The voltage divider circuit 500 can receive an input/monitored voltage (Vh) that is being protected. As shown in FIG. 5, the voltage divider circuit 500 divides the voltage Vh to output the divided voltage Vdiv to the comparator circuit 510. In the example shown in FIG. 5, the voltage divider circuit 500 includes a string of transistors 505 (e.g., NMOS transistors) each coupled to a diode 506. The resistor 508 at the end of the diode chain provides bias current to the diode chain. As described above, various different configurations of diode chain, transistors, and resistors can be configured as the voltage divider circuit 500.

As shown in FIG. 5, the other input to the comparator circuit 510 is the reference voltage Vref. Although not shown in FIG. 5, the Vref can be input to the comparator circuit 510 via the Always ON power supply of the device. A resistor ladder can be used to control the Vref level input to the comparator circuit 510. Thus, the resistor ladder can be tuned/configurable. As discussed above, in the case of non-powered ESD events, Vref may be a floating voltage. As shown in FIG. 5, one example of the comparator circuit 510 includes the transistors 515.

Although not shown in FIG. 5, for a trigger circuit using the protected voltage as the reference voltage, instead of the Vref from the Always ON supply, a second voltage divider circuit can be included that receives the input voltage Vh to be protected. The second divider circuit has a different slope than the voltage divider circuit 500. For example, the second voltage divider circuit may be configured as a resistor divider.

Based on the comparison of the voltages Vdiv and Vref, the comparator circuit 510 outputs a value to the ESD shunt circuit 520. Once the value indicates that Vdiv reaches or exceeds Vref, the ESD shunt circuit 220 shunts the current, for example, to ground. As shown in FIG. 5, one example ESD shunt circuit includes the transistors 525 and resistor 528 as the pull down.

The techniques and apparatus described herein allow for a single edge-insensitive ESD (and EOS) protection circuit, triggered based on a voltage level, to be used for multiple different types of powered and non-powered events associated with multiple different rise times. This eliminates the need for components to be used on the flex/board, thereby making the chips low cost and having a low associated bill of materials Since the gate voltage on the clamp device are very well controlled, a higher $V_{gs}$ can be obtained allowing for better ESD shunt capability.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

I claim:

1. A trigger circuit for controlling a current shunt in an integrated circuit, comprising:
   a comparison circuit configured to:
      compare a monitored voltage to a reference voltage, wherein the monitored voltage is generated by a powered or non-powered electrode static discharge (ESD) or electrostatic overstress (EOS) event; and
      output a signal indicating when the monitored voltage is equal to or greater than the reference voltage; and
   a shunt circuit configured to shunt the current based on receiving the signal from the comparison circuit.

2. The trigger circuit of claim 1, further comprising a first voltage divider circuit coupled to the comparison circuit and configured to:
   receive an input voltage;

divide the input voltage to generate the monitored voltage; and output the monitored voltage to the comparison circuit.

3. The trigger circuit of claim 2, further comprising a second voltage divider circuit coupled to the comparison circuit and configured to:

receive the input voltage;

divide the input voltage to generate the reference voltage; and output the reference voltage to the comparison circuit.

4. The trigger circuit of claim 3, wherein:

the first voltage divider circuit is configured to output the monitored voltage having a first slope of voltage to current; and the second voltage divider circuit is configured to output the reference voltage having a second slope of voltage to current different than the first slope.

5. The trigger circuit of claim 2, wherein the first voltage divider circuit is configured to divide the input voltage such that a ratio of the input voltage and the divided input voltage is above an operating voltage of integrated circuit and below a breakdown voltage of the integrated circuit.

6. The trigger circuit of claim 1, further comprising:

an inverter circuit coupled to the comparison circuit and configured to invert the output signal and output an inverted output signal to the shunt circuit.

7. The trigger circuit of claim 1, wherein the reference voltage comprises a floating voltage within a range of a diode drop voltage to a ground voltage for a non-powered event.

8. The trigger circuit of claim 1, wherein the reference voltage is above or below an operating voltage of the integrated circuit for a powered event.

9. The trigger circuit of claim 1, wherein the reference voltage is input by an always ON power supply used to power at least one component of the integrated circuit while the integrated circuit is otherwise powered down.

10. A method for controlling a current shunt in an integrated circuit, comprising:

comparing a monitored voltage to a reference voltage, wherein the monitored voltage is generated by a powered or non-powered electrode static discharge (ESD) or electrostatic overstress (EOS) event;

outputting a signal indicating when the monitored voltage is equal to or greater than the reference voltage; and shunting the current based on receiving the signal.

11. The method of claim 10, further comprising:

receiving an input voltage; and dividing the input voltage to generate the monitored voltage.

12. The method of claim 11, further comprising:

dividing the input voltage to generate the reference voltage.

13. The method of claim 12, wherein:

the input voltage is divided to output the monitored voltage having a first slope of voltage to current; and the input voltage is divided to output the reference voltage having a second slope of voltage to current different than the first slope.

14. An input device, comprising:

a plurality of sensor electrodes; and a processing system coupled to the plurality of sensor electrodes configured to operate the plurality of sensor electrodes for capacitive sensing and determine proximity of an input object based on the capacitive sensing, the processing system comprising trigger circuitry comprising:

a comparison circuit configured to:

compare a monitored voltage to a reference voltage, wherein the monitored voltage is generated by a powered or non-powered electrode static discharge (ESD) or electrostatic overstress (EOS) event; and output a signal indicating when the monitored voltage is equal to or greater than the reference voltage; and a shunt circuit configured to shunt a current based on receiving the signal from the comparison circuit.

15. The input device of claim 14, wherein the trigger circuitry further comprises a first voltage divider circuit coupled to the comparison circuit and configured to:

receive an input voltage;

divide the input voltage to generate the monitored voltage; and output the monitored voltage to the comparison circuit.

16. The input device of claim 15, wherein the trigger circuitry further comprises a second voltage divider circuit coupled to the comparison circuit and configured to:

receive the input voltage;

divide the input voltage to generate the reference voltage; and output the reference voltage to the comparison circuit, wherein:

the first voltage divider circuit is configured to output the monitored voltage having a first slope of voltage to current; and the second voltage divider circuit is configured to output the reference voltage having a second slope of voltage to current different than the first slope.

17. The input device of claim 14, wherein the reference voltage comprises a floating voltage within a range of a diode drop voltage to a ground voltage for a non-powered event, and wherein the reference voltage is above or below an operating voltage of the input device for a powered event.

18. The input device of claim 14, wherein the reference voltage is input by an always ON power supply used to power at least one component of the input device while the input device is otherwise powered down.

* * * * *